United States Patent [19]

Wagner

[11] Patent Number: 4,747,635
[45] Date of Patent: May 31, 1988

[54] VEHICLE CONVERTIBLE TOP HAVING SAIL FLAP TENSIONER

[75] Inventor: John J. Wagner, Howell, Mich.

[73] Assignee: Cars & Concepts, Inc., Brighton, Mich.

[21] Appl. No.: 20,368

[22] Filed: Mar. 2, 1987

[51] Int. Cl.⁴ .............................................. B60J 7/12
[52] U.S. Cl. .................................................... 296/107
[58] Field of Search ................ 296/107, 108, 116, 117

[56] References Cited

U.S. PATENT DOCUMENTS

| | | | |
|---|---|---|---|
| 2,289,173 | 7/1942 | Best | 296/107 |
| 2,482,323 | 9/1949 | Cromwell et al. | 296/107 |
| 2,649,330 | 8/1953 | Schamel et al. | 296/107 |
| 2,676,056 | 4/1954 | Dinges | 296/107 |
| 2,727,783 | 12/1955 | Orr | 296/107 |
| 2,754,149 | 7/1956 | McGrath et al. | 296/107 |
| 2,772,114 | 11/1956 | Hennessy | 296/107 |
| 3,075,804 | 1/1963 | Geiger et al. | 296/107 |
| 3,167,349 | 1/1965 | Young et al. | 296/107 |
| 3,276,814 | 10/1966 | Podolan | 296/107 |
| 3,773,379 | 11/1973 | Loiseau | 296/107 |

*Primary Examiner*—Robert R. Song
*Attorney, Agent, or Firm*—Brooks & Kushman

[57] ABSTRACT

A vehicle body convertible top (20) disclosed has a soft top whose sail flaps (36) are free to move with respect to the vehicle body and an associated foldable frame (22) but are connected to tensioners (40) that secure the sail flaps in the upper raised position of the convertible top. Each tensioner (40) includes a guide (42) preferably embodied by a curved tube (62) and an elongated flexible member (44) that extends through the guide tube (62) for attachment to both the associated sail flap (36) and the foldable frame (22). Upon raising of the convertible top, the tensioners (40) resiliently pull on the sail flaps (36) through a springs (49) disposed along the elongated flexible members (44) to provide the sail flap tensioning without any operator manipulation specifically directed thereto such as the snapping and unsnapping previously necessary with convertible tops.

10 Claims, 2 Drawing Sheets

VEHICLE CONVERTIBLE TOP HAVING SAIL FLAP TENSIONER

TECHNICAL FIELD

This invention relates to a vehicle convertible top having a soft top tensioner.

BACKGROUND ART

Vehicle convertible tops have previously utilized tensioners for providing tensioning of the soft top over the foldable frame at each side rail thereof in order to maintain a weather-tight condition. Such side rail tensioning is disclosed by the U.S. Pat. No. 2,482,323 of Cromwell et al adjacent each side rear window of the vehicle. Similarly, the U.S. Pat. No. 2,754,149 of McGrath et al discloses side rail tensioning of a convertible top adjacent a front window.

Prior attempts have also been made with vehicle convertible tops to provide tensioning of the soft top sail flaps which are located at each lateral side thereof rearward of the rear side window in the area normally occupied by the sail panel of rigid top vehicles. For example, U.S. Pat. No. 2,649,330 of Schamel et al discloses a convertible top whose soft top has a sail panel with a lower edge that is fixedly secured to the vehicle and also provided with magnets that secure the sail flap to the upper edge of the rear quarter panel of the vehicle. Also, U.S. Pat. No. 2,727,783 of Orr discloses a vehicle convertible top having a soft top whose sail flap is secured to the vehicle body by an extensible spring which is alleged to provide flap tensioning in the raised position of the top and to also provide proper folding upon movement to the storage position.

With certain vehicle convertible tops, the mounting of the foldable frame on the vehicle adjacent the sail flap area does not permit the sail flap to be permanently secured to the vehicle body since the geometry involved does not include sufficient flap material to permit movement of the frame between the raised and lowered positions. In the past, this type of vehicle convertible top has conventionally utilized snaps that secure the sail flap to the vehicle body after the convertible top has been raised and which are detached prior to lowering of the convertible top to its storage position. Attachment or detachment of such snaps obviously requires that either the driver or a passenger get out of the vehicle such that the raising and lowering operation of the convertible top cannot be conveniently performed while remaining within the vehicle.

In addition to the prior art references discussed above, other vehicle convertible tops and the like are disclosed by U.S. Pat. Nos. 2,676,056 Dinges; 3,075,804 Geiger et al; 3,167,349 Young et al; and 3,773,379 Loiseau.

DISCLOSURE OF INVENTION

An object of the present invention is to provide an improved vehicle convertible top that is movable between raised and storage positions without the necessity for any special operator manipulation of the soft top sail flaps even when the sail flaps cannot be secured directly to the vehicle because of the geometry of the foldable frame of the convertible top.

In carrying out the above object and other objects of the invention, a vehicle body with which the convertible top is utilized has an open occupant compartment that is selectively opened and closed by the convertible top. A foldable frame of the convertible top is mounted on the vehicle for movement between an unfolded raised position extending over the occupant compartment and a folded storage position at the rear of the occupant compartment. A soft top of the convertible top has a front edge secured to the foldable frame at a convertible top header thereof, a rear edge secured to the vehicle body adjacent the rear extremity of the occupant compartment, and a pair of sail flaps each of which has a front lower portion that is free for movement with respect to the vehicle body and the foldable frame so as to thereby permit movement of the frame between the raised and storage positions even when the frame geometry does not permit such movement with the sail flaps secured to the vehicle body.

In accordance with the invention, a pair of tensioners are respectively associated with the pair of sail flaps and each includes a guide mounted on the vehicle body adjacent the associated sail flaps. Each tensioner also includes a flexible elongated member that is received by the guide and has a first end connected to the foldable frame as well as a second end connected to the front lower portion of the associated sail flap. Each flexible elongated member is pulled by the foldable frame over its associated guide to tension the front lower portion of the sail flap connected thereto with the foldable frame in the unfolded raised position. Upon movement of the foldable frame from the raised position toward the folded storage position, the flexible elongated member can slide in a reverse direction back over the guide to permit the free movement of the associated sail flaps so as to permit the frame folding.

Each tensioner preferably includes a spring disposed along the flexible elongated member thereof to resiliently tension the front lower portion of the associated sail flap with the foldable frame in the unfolded raised position. The spring of each tensioner is preferably of the helical type and connects the first end of the associated flexible elongated member to the foldable frame.

In the preferred construction disclosed, the foldable frame includes a pair of support arms each of which has a support end mounted on the vehicle body for swinging movement adjacent the guide of the associated tensioner. Each swinging arm also has an outer end that supports the rest of the foldable frame, while each tensioner has the first end of its flexible elongated member connected to the adjacent support arm. This connection is preferably provided by the spring previously mentioned at a location between the support end and the outer end of the support arm.

In the preferred construction, each guide includes a tube through which the associated flexible elongated member extends. This guide tube preferably has a curved shape, and each tensioner also preferably includes a pair of guide openings in the vehicle body. The curved guide tube has opposite ends from which the associated flexible elongated member extends outwardly to and through the associated guide openings and thence to the foldable frame and to the associated sail flap.

The objects, features, and advantages of the present invention are readily apparent from the following detailed description of the best mode for carrying out the invention when taken in connection with the accompanying drawings.

BEST MODE FOR CARRYING OUT THE INVENTION

Figures 1, 2, 3:
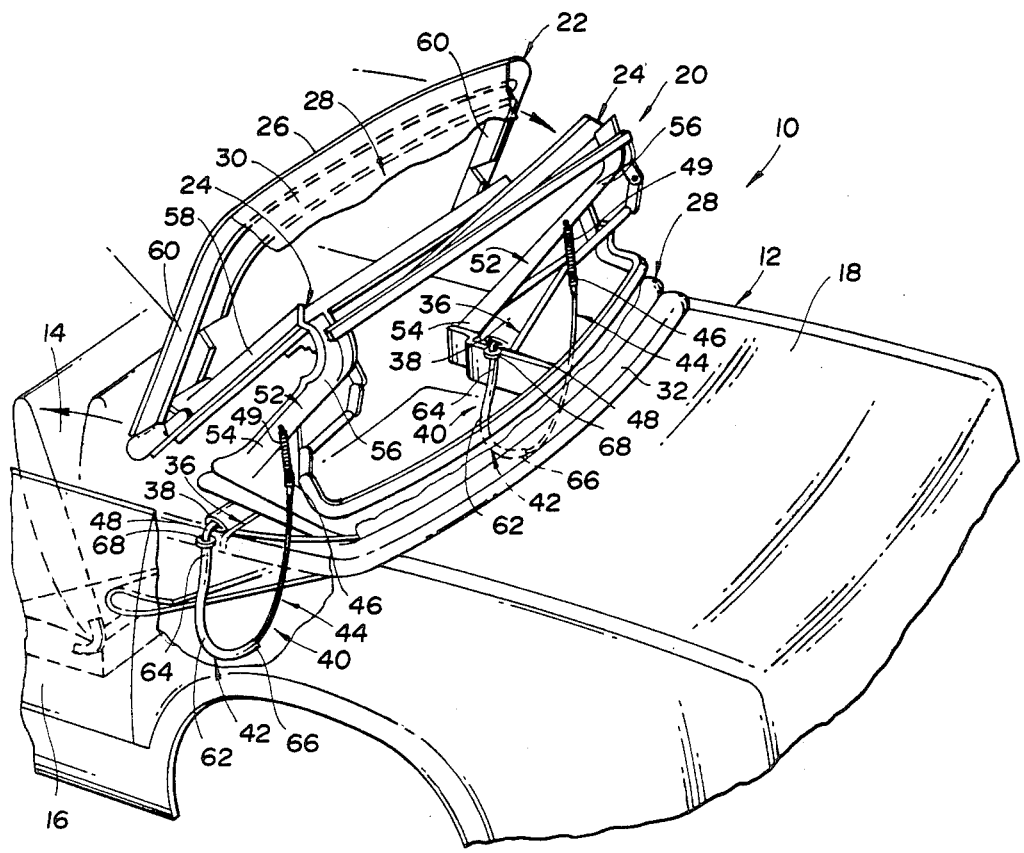
FIG. 1 is a partially broken away partial perspective view of a vehicle body including a convertible top which has sail flap tensioners constructed in accordance with the present invention.
FIG. 2 is a partial perspective view that illustrates the manner in which an elongated flexible member of each tensioner extends from the associated sail flap through a guide opening.
FIG. 3 illustrates the manner in which the elongated flexible member of each tensioner is connected to a foldable frame of the convertible top.

With reference to FIG. 1 of the drawings, a convertible vehicle 10 is disclosed as having a vehicle body 12 with an open occupant compartment 14 that is entered and exited by opening of a side door 16 in a conventional manner. Adjacent the rear extremity of the occupant compartment 14 and just forward of the vehicle rear deck lid 18, the vehicle mounts a convertible top 20 which is constructed in accordance with the present invention. This convertible top 20 includes a foldable frame 22 having a pair of foldable side rails 24 with rear ends that are mounted at opposite lateral sides of the vehicle body 12 adjacent the rear extremity of the occupant compartment 14 as is hereinafter more fully described. Front ends of the side rails 24 are connected to each other by a convertible top header 26 that extends laterally and is engaged with an unshown windshield header with the frame 22 positioned in an unfolded raised position extending over the occupant compartment 14. Movement of the foldable frame 22 to the folded storage position of FIG. 4 opens the occupant compartment 14 of the vehicle 12 illustrated in FIG. 1 in order to permit vehicle occupants to be fully exposed to the environment.

Figure 4:
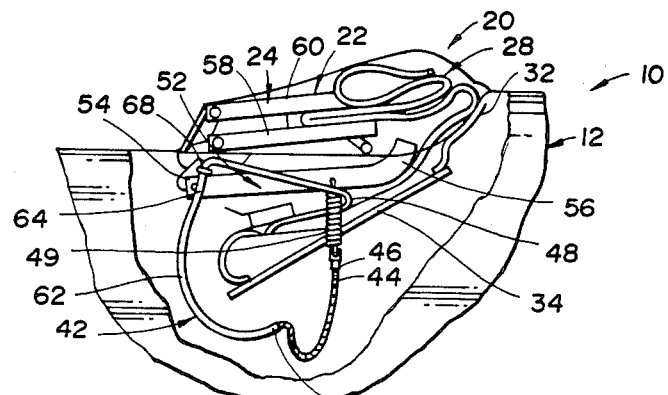
FIG. 4 is a partially broken away side view that illustrates one of the tensioners with the convertible top in its folded storage position.
Figure 5:
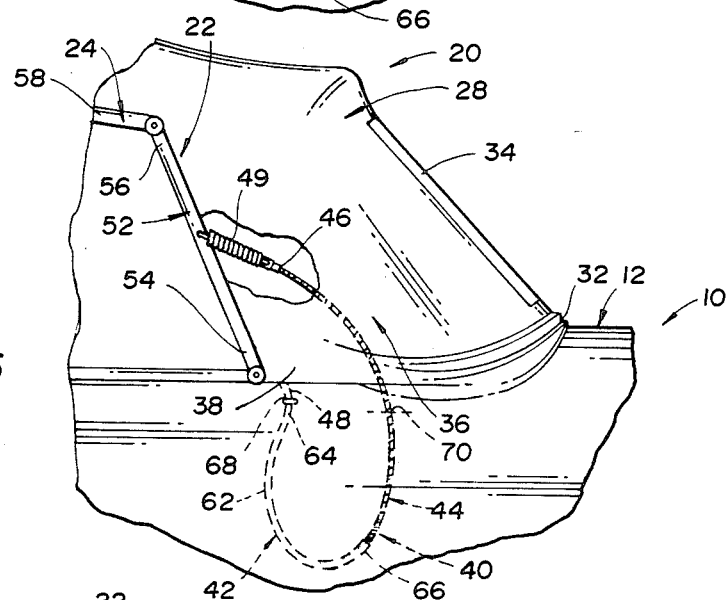
FIG. 5 is a side view that illustrates the one tensioner after the convertible top has been unfolded almost all the way to its fully raised position.
Figure 6:
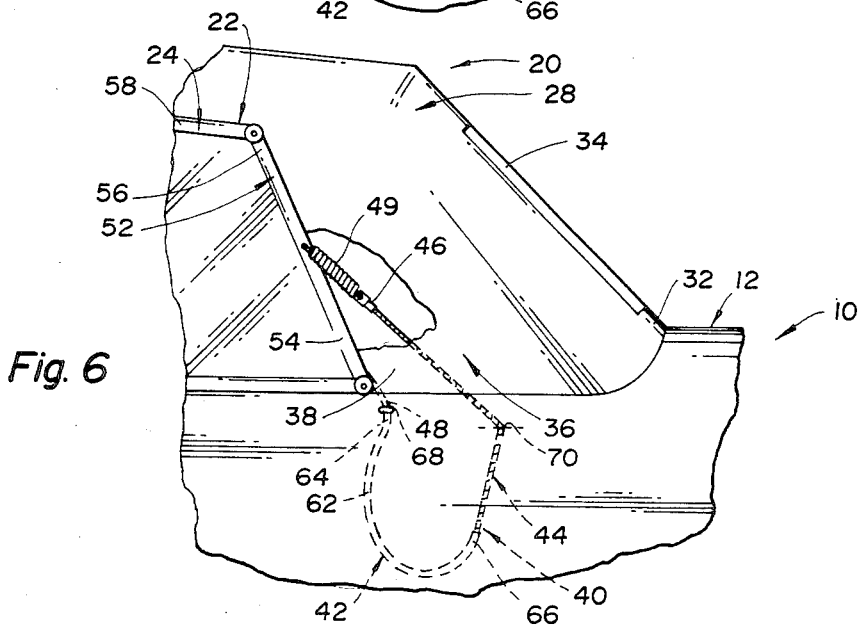
FIG. 6 is a side view that illustrates the one tensioner with the convertible top in its fully raised position.

As shown in FIGS. 4 through 6, the convertible top 20 also includes a soft top 28 having a front edge 30 that is secured to the foldable frame 22 at the windshield header 26 as shown in FIG. 1. A rear edge 32 of the soft top 28 is located below a rear window 34 thereof as shown in FIGS. 5 and 6 and is secured to the vehicle body 12 just forward of the deck lid. A pair of sail flaps 36 of the soft top 28 are located at the opposite lateral sides of the rear window 34 illustrated in FIGS. 5 and 6 and are thus adjacent the rear extremity of the occupant compartment 14 illustrated in FIG. 1. These sail flaps 36 as illustrated in FIGS. 1 and 2 each have a front lower portion 38 which has a sleeve shape and is free for movement with respect to the vehicle body and the foldable frame. Such freedom of the sail flaps allows the foldable frame to be moved between the storage position of FIG. 4 and the raised position of FIG. 6 even with frame geometry that would otherwise stretch the sail flaps and not permit such movement if the sail flaps were directly secured to the vehicle body.

As illustrated in FIG. 1, the convertible top 22 includes a pair of tensioners 40 that are respectively associated with the pair of sail flaps 36 at opposite lateral sides of the vehicle adjacent the rear extremity of its occupant compartment 14. Each tensioner includes a guide 42 mounted on the vehicle body adjacent the associated sail flap 36. In addition, each tensioner 40 includes an elongated flexible member 44 that is received by the associated guide 42 and has a first end 46 connected to the foldable frame 22 at the adjacent foldable side rail 24 as is hereinafter more fully described. A second end 48 of each flexible elongated member 44 is connected to and received within the sleeve-shaped front lower portion 38 of the associated sail flap 36 as illustrated in FIG. 2. Each flexible elongated member 44 is pulled by the foldable frame 22 over its associated guide 42 as the frame is moved from its storage position of FIG. 4 upwardly toward its almost fully raised position of FIG. 5. Upon complete movement of the convertible top frame 22 to the fully raised position of FIG. 6, the elongated flexible member 44 of each tensioner tensions the associated sail flap 36 in order to provide a taut condition thereof without the necessity for any separate manipulation such as the attachment and detachment of snaps as previously was necessary with prior art convertible tops.

As best illustrated in FIGS. 1 and 3, each tensioner 40 preferably includes a spring 49 disposed along its flexible elongated member 44 to provide resiliency in the tensioning of the front lower portion 38 of the associated sail flap 36 with the foldable frame 22 positioned in the raised position as illustrated by FIG. 6. This spring 49 of each tensioner is preferably of the helical type as shown in FIG. 3 and has a first hooked end 50 connected to an aperture in the frame side rail 24. A second hooked end 51 of spring 49 is connected to an aperture in a connector 46' of the end 46 of the elongated member 44.

As illustrated by combined reference to FIGS. 1 and 4 through 6, the foldable frame 22 has its pair of foldable side rails 24 provided with a pair of support arms 52 each of which has a support end 54 pivotally mounted on the vehicle body for swinging movement. Each support arm 52 also has an outer end 56 that supports the rest of the foldable frame by a pivotal connection to the rear end of a rear rail member 58 whose forward end is pivotally connected to the rear end of a front rail member 60 as shown in FIG. 1. Convertible top header 26 has its opposite lateral ends fixedly supported by the front ends of the front rail member 60. At the rear vehicle body supported end of each foldable side rail 24, each tensioner 40 has its spring 49 connecting the first end 46 of its elongated flexible member 44 to the associated support arm 52 between its support end 54 and outer end 56 at a generally central location midway between these ends.

As illustrated by combined reference to FIGS. 1 and 4 through 6, the guide 42 of each tensioner 40 is preferably embodied by a tube 62 through which the associated flexible elongated member extends. This guide tube 62 preferably has a curved shape and has an upper end 64 located forwardly of a lower end 66.

As illustrated in FIGS. 2 and 6, the guide of each tensioner also includes a pair of guide openings 68 and 70 in the vehicle body. As shown in FIG. 2, the upper end 64 of each guide tube 62 is fixedly mounted on the vehicle body adjacent the guide opening 68 which is located forwardly from the guide opening 70 shown in FIG. 6. The elongated flexible member 44 has its end 48 extending outwardly from the upper end 64 of the guide tube 62 to and through the guide opening 68 for attachment to the front lower portion 38 of the associated sail flap 36. Similarly, the end 46 of the elongated flexible member 44 extends outwardly from the lower end 66 of guide tube 62 to and through the rear guide opening 70 as shown in FIG. 6 and thence to the foldable frame 22 for connection thereto by the spring 49 as previously described.

It should be mentioned that the elongated flexible member 44 of each tensioner 40 is preferably embodied by a metal cable to provide the combined strength and flexibility requirements of this component during use. However, other flexible members that also have the required strength and flexibility can also be utilized.

While the best mode for carrying out the invention has been specifically disclosed, those familiar with the art to which this invention relates will recognize various alternative designs and embodiments for practicing the invention as defined by the following claims.

What is claimed is:

1. In a vehicle body having an open occupant compartment, a convertible top comprising: a foldable frame mounted on the vehicle body for movement between an unfolded raised position extending over the occupant compartment and a folded storage position at the rear of the occupant compartment; a soft top having a front edge secured to the foldable frame, a rear edge secured to the vehicle body, and a pair of sail flaps each of which has a front lower portion that is free for movement with respect to the vehicle body and the foldable frame; a pair of tensioners respectively associated with the pair of sail flaps; each tensioner including a guide mounted on the vehicle body adjacent the associated sail flap; and each tensioner also including a flexible elongated member that is received by the guide and has a first end connected to the foldable frame and a second end connected to the front lower portion of the associated sail flap, and each flexible elongated member being pulled by the foldable frame over its associated guide to tension the front lower portion of the sail flap connected thereto with the foldable frame in the unfolded raised position.

2. A convertible top as in claim 1 wherein each tensioner includes a spring disposed along the flexible elongated member thereof to resiliently tension the front lower portion of the associated sail panel with the foldable frame in the unfolded raised position.

3. A convertible top as in claim 2 wherein the spring of each tensioner is of the helical type and connects the first end of the associated flexible elongated member to the foldable frame.

4. A convertible top as in claim 1 wherein the foldable frame includes a pair of support arms each of which has a support end mounted on the vehicle body for swinging movement, each support arm having an outer end that supports the rest of the foldable frame, and each tensioner having the first end of its flexible elongated member connected to the adjacent support arm.

5. A convertible top as in claim 4 wherein each tensioner includes a spring that connects the first end of its elongated flexible member to the associated support arm between its support end and outer end.

6. A convertible top as in any preceding claim wherein each guide includes a tube through which the associated flexible elongated member extends.

7. A convertible top as in claim 6 wherein the guide tube has a curved shape.

8. A convertible top as in claim 7 wherein the guide of each tensioner also includes a pair of guide openings in the vehicle body, and the curved guide tube of each tensioner having opposite ends from which the associated flexible elongated member extends outwardly to and through the associated guide openings and thence to the foldable frame and to the associated sail flap.

9. In a vehicle body having an open occupant compartment, a convertible top comprising: a foldable frame having a pair of support arms each of which has a support end mounted on the vehicle body for movement between raised and storage positions; each support arm also having an outer end that supports the rest of the foldable frame; the support arm movement moving the foldable frame between a raised position extending over the occupant compartment and a folded storage position at the rear of the occupant compartment; a soft top having a front edge secured to the foldable frame, a rear edge secured to the vehicle body, and a pair of sail flaps each of which has a front lower portion that is free for movement with respect to the vehicle body and the foldable frame; a pair of tensioners respectively associated with the pair of sail flaps; each tensioner including a tubular guide mounted on the vehicle body adjacent the associated sail flap; each tensioner also including a flexible elongated member that extends through the associated tubular guide and has a first end connected to one of the support arms of the foldable frame; each elongated flexible member having a second end connected to the front lower portion of the associated sail flap; and each flexible elongated member being pulled by the foldable frame through its associated tubular guide and having a spring that tensions the front lower portion of the sail flap connected thereto with the foldable frame in the unfolded raised position.

10. In a vehicle body having an open occupant compartment, a convertible top comprising: a foldable frame having a pair of support arms each of which has a support end mounted on the vehicle body for movement between raised and storage positions; each support arm also having an outer end that supports the rest of the foldable frame; the support arm movement moving the foldable frame between a raised position extending over the occupant compartment and a folded storage position at the rear of the occupant compartment; a soft top having a front edge secured to the foldable frame, a rear edge secured to the vehicle body, and a pair of sail flaps each of which has a front lower portion that is free for movement with respect to the vehicle body and the foldable frame; a pair of tensioners respectively associated with the pair of sail flaps; each tensioner including a tubular guide of a curved shape mounted on the vehicle body adjacent the associated sail flap; each tensioner also including a flexible elongated member that extends through the associated tubular guide; each flexible elongated member having a first end including a spring that provides connection thereof to one of the support arms of the foldable frame; and each flexible elongated member having a second end connected to the front lower portion of the associated sail flap so as to be pulled by the foldable frame through the associated tubular guide to tension the front lower portion of the sail flap connected thereto with the foldable frame in the unfolded raised position.

* * * * *